(12) United States Patent
Ly et al.

(10) Patent No.: US 12,042,874 B2
(45) Date of Patent: Jul. 23, 2024

(54) ELECTRODE LEAD WITH A POROUS LAYER FOR ELECTRICAL DISCHARGE MACHINING

(71) Applicant: THERMOCOMPACT, Epagny Metz-Tessy (FR)

(72) Inventors: Michel Ly, Annecy (FR); Gérald Sanchez, Dingy Saint Clair (FR); Blanche Ouvrard, Annecy (FR); Ludovic Lafleur, Annecy (FR)

(73) Assignee: Thermocompact, Epagny Metz-Tessy (FR)

( * ) Notice: Subject to any disclaimer, the term of this patent is extended or adjusted under 35 U.S.C. 154(b) by 884 days.

(21) Appl. No.: 17/059,319

(22) PCT Filed: Jun. 28, 2019

(86) PCT No.: PCT/IB2019/055498
§ 371 (c)(1),
(2) Date: Nov. 27, 2020

(87) PCT Pub. No.: WO2020/008312
PCT Pub. Date: Jan. 9, 2020

(65) Prior Publication Data
US 2021/0197301 A1 Jul. 1, 2021

(30) Foreign Application Priority Data
Jul. 3, 2018 (FR) ........................ 1856118

(51) Int. Cl.
*B23H 1/06* (2006.01)
*B21C 1/00* (2006.01)
*C23C 10/28* (2006.01)
*C23C 28/02* (2006.01)

(52) U.S. Cl.
CPC ............... *B23H 1/06* (2013.01); *B21C 1/003* (2013.01); *C23C 10/28* (2013.01); *C23C 28/025* (2013.01); *C23C 28/028* (2013.01)

(58) Field of Classification Search
CPC .............. B23H 1/04; B23H 1/06; B21C 1/003
See application file for complete search history.

(56) References Cited

U.S. PATENT DOCUMENTS

| 3,290,124 | A | * | 12/1966 | Holtzclaw, Jr. | ........... B23H 1/06 428/569 |
| 4,341,939 | A | | 7/1982 | Briffod | |
| 5,945,010 | A | | 8/1999 | Tomalin | |
| 8,067,689 | B2 | | 11/2011 | Tomalin | |
| 10,583,509 | B2 | * | 3/2020 | Weber | ..................... B23H 1/06 |

(Continued)

FOREIGN PATENT DOCUMENTS

JP 2014-136285 A 7/2014

*Primary Examiner* — John J Norton
*Assistant Examiner* — Franklin Jefferson Wang
(74) *Attorney, Agent, or Firm* — William H. Eilberg (57) ABSTRACT

According to the invention, the electrode wire (1) for electric discharge machining comprises a metal core (2), in one or more layers of metal or metal alloy. On the metal core (2), a coating (3) having an alloy different from that of the metal core (2) contains more than 50 wt % zinc. The coating (3) comprises copper-zinc alloy (3a) of fractured γ phase, and covers the majority of the metal core (2). The coating (3) contains covered pores (5a, 5b, 5c, 5d, 5) larger than 2 μm.

15 Claims, 8 Drawing Sheets

(56) References Cited

U.S. PATENT DOCUMENTS

| | | |
|---|---|---|
| 2001/0014411 A1 | 8/2001 | Seong |
| 2002/0092831 A1 | 7/2002 | Seong |
| 2008/0061038 A1* | 3/2008 | Blanc ....................... B23H 7/08 |
| | | 148/684 |
| 2008/0245773 A1* | 10/2008 | Lee .......................... B23H 7/08 |
| | | 219/69.12 |
| 2016/0368070 A1* | 12/2016 | Liang ....................... B23H 7/08 |
| 2019/0233919 A1* | 8/2019 | Tomalin ................... C25D 5/48 |

* cited by examiner

ELECTRODE LEAD WITH A POROUS LAYER FOR ELECTRICAL DISCHARGE MACHINING

TECHNICAL FIELD OF THE INVENTION

The present invention relates to electrode wires used for cutting electrically conducting metals or materials, by electric discharge machining in an electric discharge machine.

The well-known process of electric discharge machining allows material to be removed from an electrically conducting workpiece, by generating sparks in a machining zone between the workpiece and an electrically conducting electrode wire. The electrode wire runs continuously in the vicinity of the workpiece in the direction of the length of the wire, held by guides, and it is gradually displaced in the transverse direction toward the workpiece, either by transverse translation of the wire guides or by translation of the workpiece.

An electric generator, connected to the electrode wire by electrical contacts away from the machining zone, establishes a suitable potential difference between the electrode wire and the conductive workpiece to be machined. The machining zone between the electrode wire and the workpiece is immersed in a suitable dielectric fluid. The potential difference causes sparks to appear between the electrode wire and the workpiece, which gradually erode the workpiece and the electrode wire. The longitudinal travel of the electrode wire allows a sufficient wire diameter to be maintained permanently to prevent it breaking in the machining zone. The relative displacement of the wire and the workpiece in the transverse direction makes it possible to cut the workpiece or treat its surface, as required.

The particles detached from the electrode wire and the workpiece by the sparks are dispersed in the dielectric fluid, where they are removed.

To obtain accurate machining, notably for making angular cuts with a small radius, it is necessary to use wires of small diameter that support a high mechanical load at rupture, to be stretched in the machining zone and to limit the amplitude of the vibrations.

Most of the modern machines for electric discharge machining are designed for the use of metal wires, generally with a diameter of 0.25 mm, and with a breaking load between 400 and 1000 N/mm$^2$.

As electric discharge machining is a relatively slow process, there is also a need to maximize the machining speed, notably the rough machining speed. In the present patent application, the rough machining speed is evaluated in mm$^2$/min, i.e. in the rate of increase of a cut area, or in mm/min at a given workpiece height. i.e. the speed of penetration of the wire into the workpiece.

It has been assumed until now that this speed depends directly on the spark erosion energy released in the machining zone between the wire and the workpiece, and therefore depends on the electrical energy that the wire can convey to the machining zone. However, the erosive discharges in the machining zone, and the Joule effect produced by the electric current passing through the wire, tend to heat the wire and at the same time reduce its mechanical breaking strength.

One of the limitations of wires for electric discharge machining is thus that they break under the combined effect of heating and mechanical tension. This compels users to limit the machining power of their spark erosion machines, and this also limits the machining speed.

It has already been proposed to use wires for electric discharge machining comprising a metal core and a continuous coating of zinc, the effect of the coating being to limit the heating of the metal core thanks to the heat energy consumed by the zinc as it is vaporized. This makes it possible to increase the machining power delivered by the electric discharge machine, and therefore the machining speed relative to that of a bare brass wire. However, the layer of pure zinc is consumed very quickly, and does not protect the core of the wire for a sufficient time for cutting through thick workpieces.

Document CH 633 739 A5 describes a wire for electric discharge machining and the manufacturing process thereof, the wire having a core that may be of copper or of an alloy of copper and zinc, and having a coating of an alloy different from copper and zinc and covered with a zinc oxide film. The document mentions that the coating of copper-zinc alloy has a porous structure resulting from the Kirkendall effect (different diffusion rates of copper and zinc), and that the wire has a rough surface with holes from 1 to 2 μm, the zinc oxide film closely following the surface roughness. The document teaches that this rough surface structure of the wire is more easily wetted by the water serving as dielectric fluid for machining, which increases the wire cooling function and allows a higher current to pass.

Document EP 0 930 131 B1 also describes a wire for electric discharge machining, and the manufacturing process thereof, the wire having a core of a first metal comprising copper, a layer of alloy formed on the core, and a surface layer on the layer of alloy and consisting of a second metal having a lower vaporization temperature than that of the first metal. The document teaches the advantage of obtaining a porous surface layer of the wire, and the pores are open as this increases the area of contact between the wire and the dielectric fluid for machining, for better cooling of the wire. The document also teaches that the porous layer promotes removal of the waste products from machining. This results in an increase in machining speed. According to the process described in this document, the surface of the wire is crazed. The wire is obtained by immersing a brass core with a diameter of 0.9 mm in a bath of molten zinc, and then drawing this coated wire to the final diameter of 0.1 to 0.4 mm.

In document U.S. Pat. No. 5,945,010 it is proposed to anneal zinc-coated α-phase brass so as to produce a peripheral layer of γ-phase brass, and then draw the blank thus obtained to give the final diameter. The wiredrawing produces a surface layer of fractured γ-phase brass. The fractures are open toward the exterior, so that the level of coverage of the core by the peripheral layer of γ-phase brass is at most 58%. The surface of the resultant wire for electric discharge machining is irregular, and the document teaches that this promotes removal of the waste products from machining, but without the machining speed being increased.

Document U.S. Pat. No. 8,067,689 B2 teaches the advantage of a sublayer of fractured γ-phase brass, immersed in a substantially continuous outer layer of zinc or of α-phase brass. The wire for electric discharge machining is obtained by taking a core of brass containing 60% copper and 40% zinc, having a diameter of 0.9 mm, which is given a coating of 10 μm of zinc. Heat treatment for 6 hours at 170° C. in nitrogen transforms the zinc, by diffusion, into a layer of γ-phase brass. The layer of γ-phase brass is then covered by electrolysis with a surface layer of 10 μm of zinc, and a wiredrawing operation reduces the diameter to 0.25 mm. The document teaches that the wiredrawing operation fractures the layer of γ-phase brass, and that simultaneously the particles of γ-phase brass resulting from the fracturing are embedded in the zinc of the surface layer. The document also mentions that the zinc of the surface layer may then be transformed into ε-phase brass by low-temperature heat treatment, and that the resultant ε phase may be porous. The pores are open as they may in their turn be filled with graphite by a wiredrawing operation in the presence of a suspension of graphite particles in an aqueous medium. A drawback of a wire of this kind for electric discharge machining is that some of the material of the surface layer tends to become detached in the form of powder when using the wire in an electric discharge machine. This powder may accumulate in the guides and cause blocking and undesirable breakage of the wire for electric discharge machining.

Figure 2:
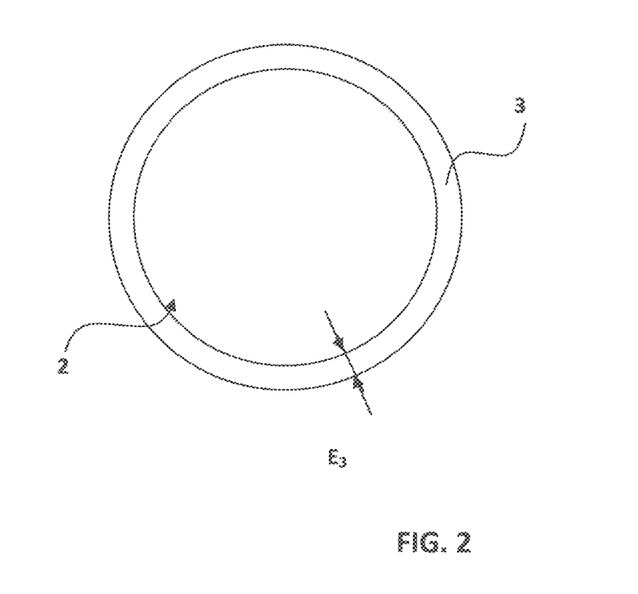
FIG. 2 is a schematic cross section, on a larger scale, of the electrode wire in FIG. 1, according to a first embodiment of the core of the electrode wire.

Document FR 2 881 973 A1 describes an electrode wire according to the preamble of claim 1. The sizes of the covered pores illustrated in FIG. 2 are not described explicitly, and no process is described for obtaining covered pores larger than 2 μm.

Figure 6:
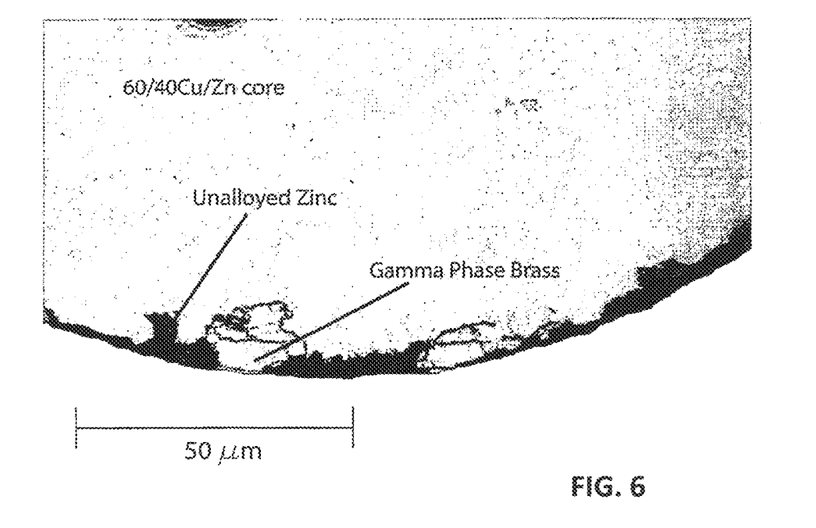
FIG. 6 is a partial cross-sectional view of a wire of the prior art according to document U.S. Pat. No. 8,067,689.

In the present description and in the claims, the structure of the wires for electric discharge machining is characterized notably by the phases of the alloys making up the coating of the metal core. These phases are described in the phase equilibrium diagrams of the copper-zinc system. An example of a phase equilibrium diagram is shown in FIG. 6. The phases are characterized by their composition or by their crystallographic structure.

In practice, the expression "β-phase brass" denotes an alloy of copper and zinc having approximately 45% to 49% zinc. At room temperature, this β phase is ordered and rather brittle, and is usually called β'. Above a certain temperature, the structure becomes disordered and is then called β phase. The transition between the β and β' phases is inevitable, but produces few effects. As a result, for simplicity, this brass will be denoted in the present description by the single expression "β-phase brass".

In the description and in the claims, the expression "γ-phase brass" is used for denoting an alloy of copper and zinc in which zinc is present in a proportion of about 67 wt %.

In the description and in the claims, the expression "ε-phase brass" is used for denoting an alloy of copper and zinc in which zinc is present in a proportion of about 83 wt %.

In the description and in the claims, the expression "η-phase brass" is used for denoting an alloy of copper and zinc in which zinc is present in a proportion between 99 and 100 wt %.

An "α-phase brass" may have a zinc content below 40 wt %, for example about 35 wt %, or even about 20 wt %.

DESCRIPTION OF THE INVENTION

There is still a need for machining as quickly as possible, while avoiding detachment of material in the form of powder during machining.

The present invention results from the surprising observation that, in an electrode wire for electric discharge machining having a given core structure and a coating comprising a fractured layer of an alloy containing more than 50 wt % zinc, the speed of machining may be increased further when covered pores are present in the fractured layer under the surface of the wire, and when the pores are large enough and are sufficiently covered for the coating to cover the majority of the core. This finding goes against the teaching of documents CH 633 739 A5, EP 0 930 131 B1 and U.S. Pat. No. 5,945,010, which on the contrary suggest, for increasing the cutting speed, making an irregular wire surface layer, i.e. comprising numerous open pores toward the exterior, to promote contact with the dielectric fluid for cooling the wire, and to promote hydraulic turbulence in the dielectric fluid for removing the waste products from machining.

In this respect, for comparing the technical effects obtained with different coatings, it is necessary for the electrode wires for electric discharge machining to have an identical core structure. In fact it is known that the structure of the core has an effect on the speed of electric discharge machining. For example, for an identical structure of the coating, a wire for electric discharge machining having a core of brass containing 80% copper and 20% zinc allows a higher machining speed than a wire for electric discharge machining having a core of brass containing 63% copper and 37% zinc.

In the present description and the accompanying claims, a pore denotes a space not containing solid matter, included in a larger volume of matter in the solid state. In a plane of section of the electrode wire for electric discharge machining, a pore is a surface of the plane not comprising solid matter. The dimensions of a pore in the plane of observation are said to be greater than 2 μm when a circle with a diameter of 2 μm can be drawn inside the pore. Thus, the size of the pore is the diameter of the largest circle that can be drawn inside it.

An open pore, such as those present in the irregular surface of the electrode wires for electric discharge machining described in the prior-art documents cited above, is not covered with solid matter. Thus, a radial straight line, starting from the axis of the electrode wire for electric discharge machining, and passing through said circle, leaves definitively from the zone of solid matter of the graphical section observed.

In contrast, a covered pore in the sense of the present invention appears to be limited by solid matter at the surface of the wire. In this case, any radial straight line, starting from the axis of the electrode wire for electric discharge machining and passing through said circle defining the size of the pore, only leaves the wire after again passing through solid matter.

For observing the pores in an observation plane in section of a wire, a section should be prepared, polished, and observed with a microscope with a small depth of field. A depth of field of less than 1 μm may be suitable.

The degree of longitudinal coverage denotes, when observing a longitudinal section of wire, the length of wire covered by the coating, divided by the total length of the observed longitudinal section of the wire.

The longitudinal sections of the wire for electric discharge machining pass through a plane that is close to the median longitudinal axis of the wire. This is checked by measuring the apparent width of the wire, which must be equal to the diameter of the wire for example to within 2%.

For describing and evaluating the number of pores, transverse plane sections of the wire for electric discharge machining are considered, i.e. sections approximately perpendicular to the longitudinal axis of the wire for electric discharge machining. Transverse orientation of the plane section is checked by comparing the major axis and the minor axis of the ellipse forming the contour of the transverse plane section. The length of the minor axis of the ellipse must be at least 0.9 times the length of the major axis for the section to be regarded as transverse, i.e. approximately perpendicular to the axis of the wire.

Thus, for further improvement of the speed of electric discharge machining, the present invention proposes an electrode wire for electric discharge machining, comprising:
- a metal core, in one or more layers of metal or metal alloy,
- on the metal core, a coating having an alloy different from that of the metal core and containing more than 50 wt % zinc,
- the coating comprises fractured γ phase copper-zinc alloy,
- the coating contains covered pores larger than 2 μm, in which:
- some or all of the pores are covered with one or more alloys of copper and zinc with more than 58% and less than 100% zinc by weight.

Although these explanations are not certain, it is thought that the covered pores of sufficient size reduce the thermal conductivity of the wire in the radial direction between the outside surface of the wire and the core. When the surface of the electrode wire is subjected to a machining spark, its surface temperature thus increases more quickly in the presence of covered pores than in their absence. As a result, the metallic surface layer covering the pores of the electrode wire evaporates more quickly. For the brief duration of the spark, this creates a high metal vapor pressure in the electric arc, and this high pressure increases the removal of material from the surface of the workpiece. The efficiency of the electric arc is thus optimized owing to rapid evaporation of the material covering the pores, said evaporation being accelerated owing to the insulation provided by the pores themselves with respect to the core of the electrode wire.

Simultaneously, as a result of the manufacturing process allowing the covered pores to be produced, because of the moderate wiredrawing, it can be seen that there is an appreciable reduction in the risk of crumbling of the surface layer of the electrode wire, and it is this crumbling that may allow material to be released in the form of powder while using the electrode wire for electric discharge machining. In addition, it can be seen that there is better integrity of the electrode wire during the initial rethreading step in an electric discharge machine because the diffusion heat treatment which makes it possible to keep the alloy of copper and zinc at more than 58% of zinc by weight takes place below the recrystallization temperature of the core.

Likewise, as a result of the process, it is observed that high degrees of coverage are obtained. Thus, the coverage is greater than 85% for an electrode wire diameter of about 0.3 mm, the coverage is greater than 75% for an electrode wire diameter of about 0.25 mm, and the coverage is greater than 65% for an electrode wire diameter of about 0.2 mm.

More advantageously, the coverage will be greater than 85% for an electrode wire diameter of about 0.25 mm.

More advantageously, it may be specified that some or all of the pores are covered by one or more alloys of copper and zinc to more than 78% and less than 100% zinc by weight.

According to a particular embodiment, it may be specified that some or all of the pores are covered with a mixture of alloys of copper and zinc of ε phase and η phase.

Moreover, for a further increase in the speed of rough machining, it may advantageously be specified that the core comprises a metal core and an intermediate layer of alloy of copper and zinc of β phase.

In this case, the core may be of copper or copper alloy.

According to an advantageous embodiment, the coating of the electrode wire comprises on average, in each complete cross section of the electrode wire, at least 3 covered pores larger than 2 μm.

Preferably, the coating of the electrode wire comprises on average, in each complete cross section of the electrode wire, at least 5 covered pores larger than 2 μm.

There may be an advantage in specifying that the coating of the electrode wire contains covered pores larger than 3 μm, or more advantageously that it contains covered pores larger than 4 μm.

A difficulty that had to be resolved in the design of the present invention was to design processes allowing covered pores to be produced with a sufficient size and in a sufficient number.

In fact, the processes described in the documents of the prior art cited above lead to the production of open pores, i.e. holes in the outside surface of the wire for electric discharge machining, appreciably reducing the coverage, and producing technical effects different from those sought by the present invention.

Based on the observation that drawing of a wire blank having a coating of alloy of copper and zinc of γ phase fractures the layer of alloy and produces interstices between the blocks of alloy, the inventors tried to cover the interstices at least partly, thus producing covered pores.

However, it is not sufficient to cover the layer of alloy of copper and zinc of γ phase with a surface layer of zinc or of some other zinc alloy to obtain covered pores that give improved performance. It was found that:
- if the surface layer of zinc, of alloy of copper and zinc of η phase, or of alloy of copper and zinc of ε phase is too thick relative to the thickness of the layer of alloy of copper and zinc of γ phase, then the layer of alloy of copper and zinc of γ phase does not fracture and there are no pores, and no improvement in machining speed;
- if the surface layer of zinc, of alloy of copper and zinc of η phase, or of alloy of copper and zinc of ε phase is too thin relative to the thickness of the layer of alloy of copper and zinc of γ phase, then the pores are open instead of being covered, and there is no improvement in machining speed;
- if the layer of alloy of copper and zinc of γ phase is too thin, then the zinc, the alloy of copper and zinc of η phase, or the alloy of copper and zinc of ε phase fills the interstices completely or almost completely, and there are no covered pores, or the covered pores are of small size, and the effect on the machining speed is slight or zero;
- if the layer of alloy of copper and zinc of γ phase is too thick, then the drawn wire is brittle, i.e. it breaks easily when bent, notably during a step of automatic rethreading following breakage;
- if wiredrawing is not carried out correctly on suitable layers of alloy, the electrode wire produces a lot of powder when it is used in electric discharge machining.

According to a first possibility, a zinc coating was produced on top of the interstices already created in the fractured γ phase of the coating. The voids are thus trapped and constitute covered pores, or sites initiating the latter.

According to a second possibility, very slight drawing was carried out on a wire coated with superposed layers of γ and η phases (lightly alloyed zinc).

Thus, according to another aspect, the invention proposes an economical process for producing an electrode wire of this kind, comprising the steps:
a) providing a brass core,
b) covering the core with a layer of zinc electrolytically, to make a preliminary blank,
c) subjecting the preliminary blank to a first wiredrawing to a diameter of about 120% of the final diameter, d) subjecting the drawn preliminary blank to diffusion heat treatment at a temperature between about 170° C. and about 180° C. for about 2 h, selecting the thickness of the layer of zinc, the temperature and the duration so as to produce, by diffusion between the zinc of the coating layer and the brass of the core, a blank having a sublayer of γ-phase brass, an intermediate layer of ε-phase brass, and an outer layer of zinc or of η-phase brass, e) subjecting the blank thus diffused to a second cold wiredrawing, to give the final diameter.

The γ-phase brass fractured during the second wiredrawing.

In the course of the second wiredrawing, the layer of ε-phase brass and the surface zinc only very partially filled the voids created between the blocks of γ phase, thus producing covered pores.

By means of a subsequent heat treatment at low temperature, at about 140° C., the outer layer of zinc or of η-phase brass covering the pores can be converted to ε phase or γ phase, without the core being recrystallized, i.e. without it passing from the work-hardened state to the annealed state.

Preferably, the first wiredrawing produces a reduction in diameter between about 40% and 78%.

Other methods for obtaining covered pores are disclosed in the description given hereunder.

Among the methods which are described, preference may be given to those which are particularly suitable for industrial production because of their ease of implementation owing to a reduced number of heat treatments carried out over a wire diameter which is markedly greater than the final diameter.

BRIEF DESCRIPTION OF THE DRAWINGS

Other aims, features and advantages of the present invention will become clearer from the following description of particular embodiments, referring to the appended figures, where.

DESCRIPTION OF THE PREFERRED EMBODIMENTS

In the embodiments illustrated in the figures, an electrode wire 1 for electric discharge machining comprises a metal core 2, covered with a coating 3 of thickness $E_3$ comprising fractured γ-phase brass.

In the embodiment illustrated in FIG. 2, the metal core 2 comprises a single layer of metal or metal alloy, for example an alloy with 63% copper and 37% zinc, or an alloy with 80% copper and 20% zinc.

Figure 3:
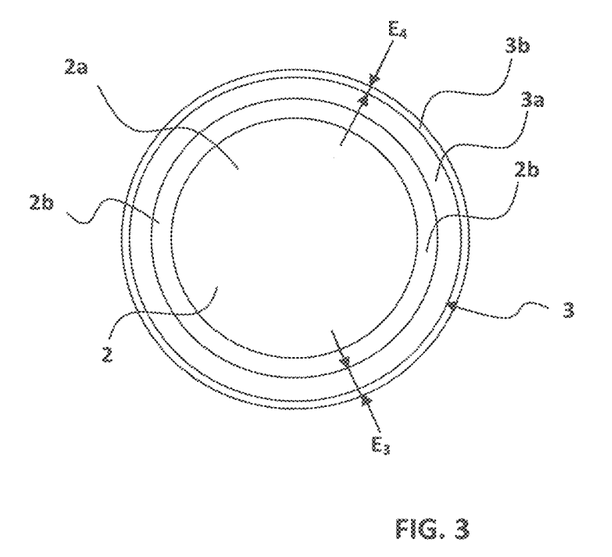
FIG. 3 is a schematic cross section, on a larger scale, of the electrode wire in FIG. 1, according to a second embodiment of the core of the electrode wire.

In the embodiment illustrated in FIG. 3, the metal core 2 comprises two different layers of metal or metal alloy, which differ by the presence of a metal core 2a, for example of α-phase brass, and an intermediate layer 2b of alloy of copper and zinc of β phase.

In this same embodiment in FIG. 3, the coating 3 comprises an inner layer 3a of alloy of copper and zinc of fractured γ phase, i.e. in the form of blocks, and further comprises an outer layer 3b of thickness $E_4$ of zinc or alloy of zinc and copper of ε phase.

Figure 1:
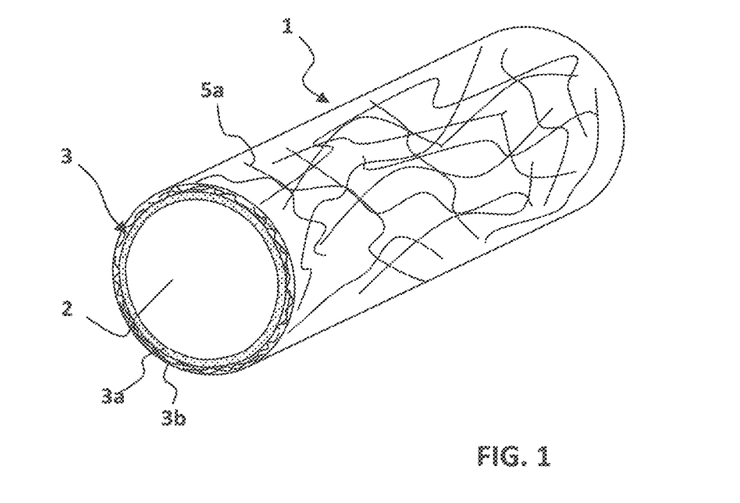
FIG. 1 is a schematic perspective view of an electrode wire for electric discharge machining according to the present invention.
Figure 4:
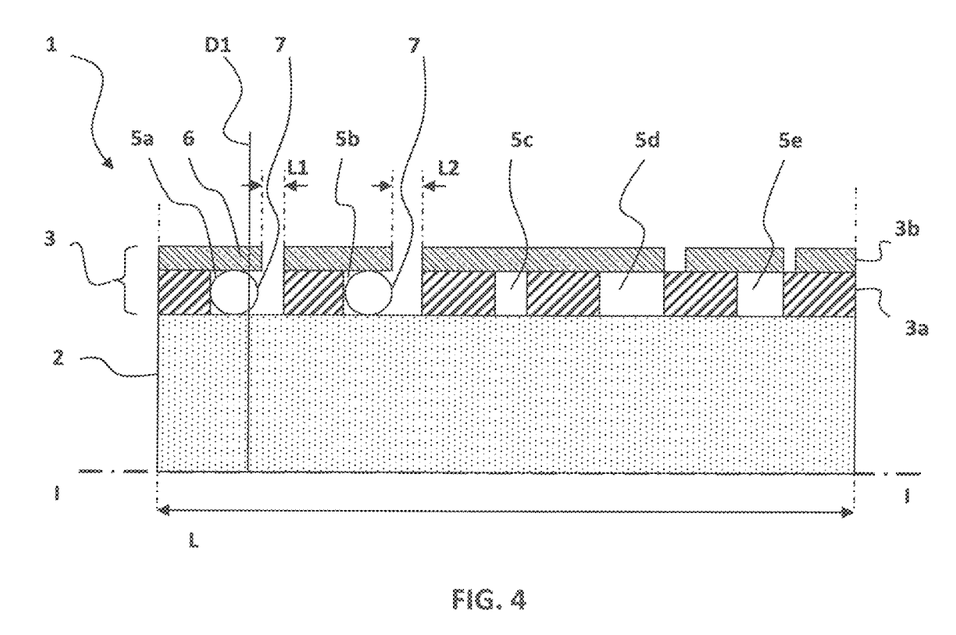
FIG. 4 is a schematic partial view in longitudinal section, on a larger scale, of a segment of the electrode wire according to FIG. 1.
Figure 5:
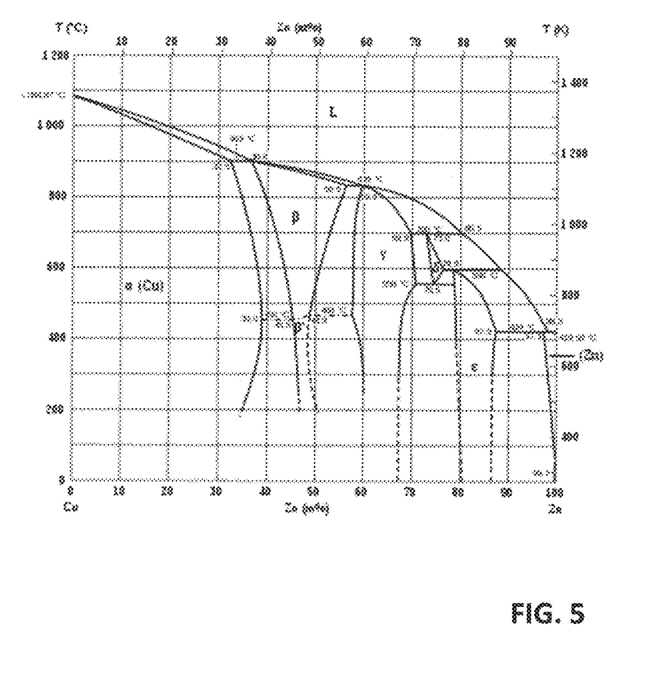
FIG. 5 shows an example of a phase equilibrium diagram of the copper-zinc system.

Let us now consider FIG. 4, which shows, schematically and on a larger scale, a partial view in longitudinal section of a segment of length L of the electrode wire 1 in FIG. 1, in the radial region of the coating 3 covering the core 2.

The coating 3, with fractured structure, contains covered pores 5a, 5b, 5c, 5d and 5e.

FIG. 4 shows the size of the covered pores. We can see, for example in the covered pores 5a and 5b, an internal cavity, in which a circle 7 can be drawn. When the circle 7 comes into contact with opposite walls of the cavity, the diameter of the circle 7 defines the size of the pore.

The pores, for example pore 5b, are said to be "covered" as the radial straight lines such as the straight line D1, starting from the axis I-I of the electrode wire and passing through said circle 7, only leave the wire after again passing through solid matter 6. Similarly, the pore will be said to be "covered" when said circle 7 is covered with solid matter 6.

In the illustration in FIG. 4, the pores 5c, 5d and 5e are completely covered, in the sense that no radial straight line passing through them emerges from the wire without passing through solid matter again. In other words, observation of the outside surface of the electrode wire in a radial direction cannot discern the internal cavity constituting the volume of the pore. In contrast, the pores 5a and 5b are covered, but only partially, in the sense that radial straight lines passing through them in the spaces illustrated by the lengths L1 and L2 can emerge from the pore without passing through solid matter again. In other words, observation of the outside surface of the electrode wire in a radial direction can then at least partly discern the internal cavity constituting the volume of the pore 5a or 5b.

FIG. 4 also illustrates the degree of longitudinal coverage Tc according to which the coating 3 covers the metal core 2. In the longitudinal section of wire observed, with total length L, the length of the core 2 not covered by the coating 3 is equal to the sum of the lengths L1 and L2 of the spaces according to which radial straight lines passing through the pores 5a and 5b can emerge from the pore without passing through solid matter. The degree of coverage Tc is then defined by the formula:

$$Tc=[(\text{total length})-(\text{length uncovered})]/(\text{total length}) = 1-(L1+L2)/L$$

Several embodiment examples of electrode wires of this kind comprising covered pores will now be described.

In all these examples, the wiredrawing steps were carried out with injection of an emulsion of 5 to 10 vol % of oil in water in the wiredrawing dies. The heat treatment steps were carried out in the free atmosphere, without special precautions to avoid the presence of oxides on the outside surface of the electrode wire.

Example No. 1

In this first example, the electrode wire (sample A) was produced by the following method:
- take a core of brass with 63% copper and 37% zinc, with a diameter of 1.25 mm,
- deposit a first layer of zinc with a thickness of 6 μm on this core.
- draw to 0.46 mm.
- carry out diffusion heat treatment to obtain an outer layer of γ-phase brass, about 4 μm thick; in practice, the heat treatment may be about 6 hours at 180° C.
- draw to 0.30 mm: the γ phase fractures into blocks of about 5 μm, leaving voids between said blocks,
- deposit a layer of zinc about 2 μm thick,
- draw to 0.25 mm.

Figure 7:
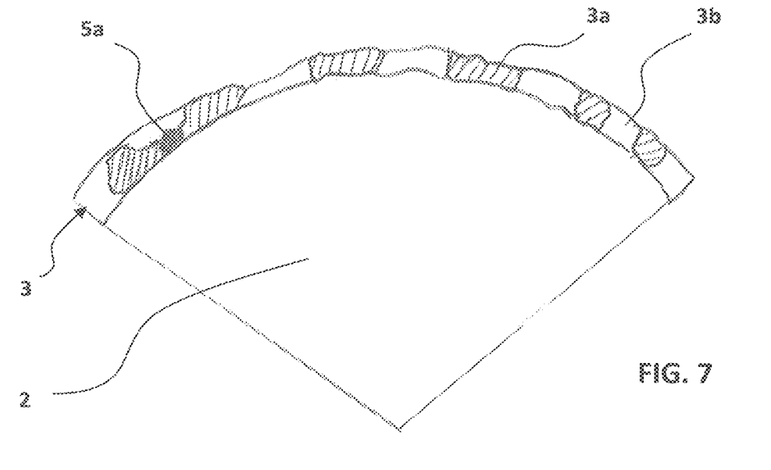
FIG. 7 is a schematic partial cross-sectional view of a wire sample A according to example No. 1 of the present description.

A wire sample A of this kind is shown schematically in partial cross section in FIG. 7.

It was found that, in a wire A of this kind, covered pores 5a are observable in cross sections of the wire. In fact, in the coating 3 covering the core 2, the ductile zinc of the outer layer 3b has only partially filled the voids present between the blocks of layer 3a of γ-phase brass. However, the covered pores 5a are few in number, and of small size (less than about 2 μm).

With a subsequent heat treatment at low temperature (about 60° C. for 48 hours), a wire was produced (sample A') in which the outer layer 3b of zinc covering the pores 5a was converted by diffusion into ε-phase brass, without the core 2 being recrystallized, and without causing the covered pores to disappear.

Example No. 2

In this second example, the electrode wire (sample B) was produced by the following method:
- take a core of brass with 63% copper and 37% zinc, with a diameter of 1.25 mm,
- deposit a first layer of zinc with a thickness of 20 μm on this core,
- draw to 0.30 mm,
- carry out diffusion heat treatment at 180° C. for 2 hours for partially transforming the outer layer of zinc into a 6 μm layer of γ-phase brass; the coating then comprises a layer of γ-phase brass near the core, and a 5 μm outer layer of ε-phase brass,
- draw to 0.25 mm.

Figure 8:
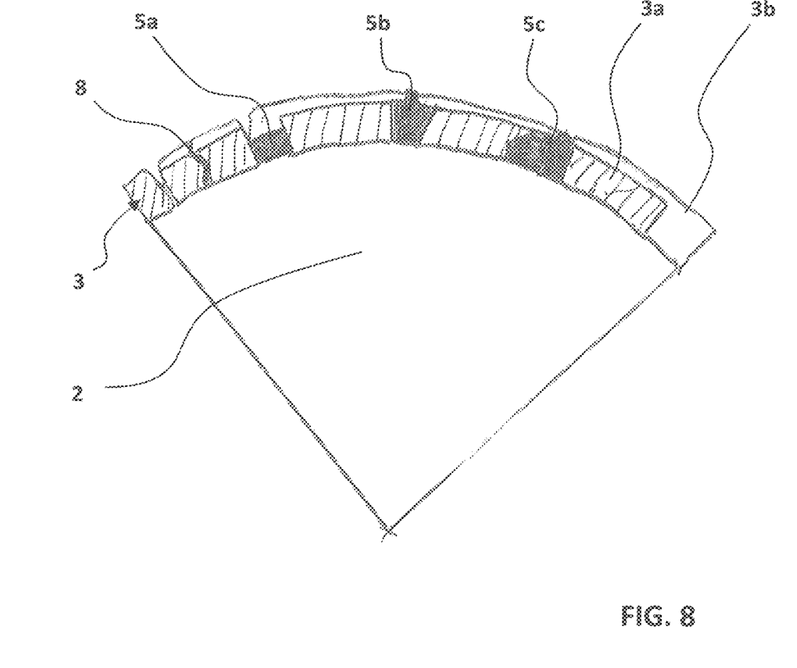
FIG. 8 is a schematic partial cross-sectional view of a wire sample B according to example No. 2 of the present invention.

A wire sample B of this kind is shown schematically in partial cross section in FIG. 8.

It was found that, in a wire B of this kind, covered pores 5a, 5b, 5c are observable in cross sections of the wire. In the coating 3 covering the core 2 of the wire, the γ phase of the layer 3a fractured into blocks during the second wiredrawing. The outer layer 3b of ε phase has only very partially filled the voids created between the blocks of the layer 3a of γ phase, leaving behind covered pores 5a, 5b, 5c that are more numerous and larger (possibly exceeding 4 μm). The degree of longitudinal coverage was greater than 90%.

With a subsequent heat treatment at low temperature (at a temperature of about 180° C. for 4 hours), the outer layer 3b of ε phase covering the pores can be converted to γ-phase brass, without the core 2 being recrystallized, and without causing the covered pores 5a, 5b, 5c to disappear.

In FIG. 8, a crack 8 is illustrated schematically, which is clearly different from the covered pores according to the present invention with respect to its shape and its volume, and which opens onto the surface of the wire.

Figure 11:
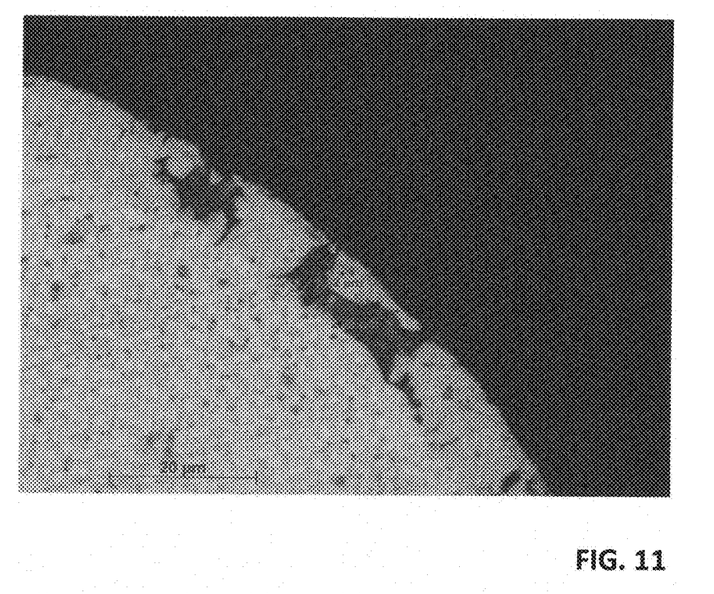
FIG. 11 is a light microscope photograph of a cross section of the wire sample B according to the present invention.
Figure 12:
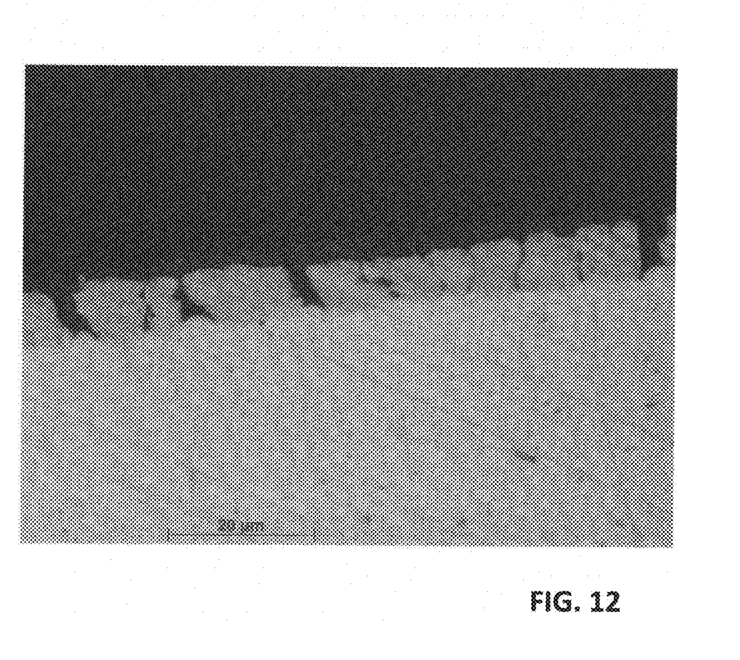
FIG. 12 is a light microscope photograph of a longitudinal section of the wire sample B in FIG. 11.

The photographs in FIGS. 11 and 12 illustrate the presence of covered pores in a longitudinal section and a cross section of the wire B, respectively.

Example No. 3

In this third example, the electrode wire (sample C) was produced by the following method:
- take a core of brass with 80% copper and 20% zinc, with a diameter of 1.20 mm,
- deposit a first layer of zinc with a thickness of 30 μm on this core,
- carry out a first heat treatment of 20 hours at 385° C. to obtain: a sublayer of β phase about 60 μm thick, and an outer layer of γ phase about 15 μm thick,
- draw to 0.62 mm; the γ phase fractures,
- make a coating of 3 μm of zinc on the fractured γ phase, degreased and deoxidized beforehand,
- draw to 0.25 mm,
- carry out a heat treatment of 5 hours at 130° C.

The surface zinc was transformed into ε-phase brass.

It was found that, in a wire C of this kind, the degree of longitudinal coverage that was obtained was about 90%. Covered pores are observable in cross sections of the wire. Some of these pores may be larger than 3 μm. On average, more than 3 covered pores are observed per complete cross section of the wire.

Example No. 4

In this fourth example, the electrode wire (sample D) was produced by the following method:
- take a core of brass with 80% copper and 20% zinc, with a diameter of 1 20 mm,
- deposit a first layer of zinc with a thickness of 38 μm on this core,
- carry out a first heat treatment of 22 hours at 395° C. to obtain: a sublayer of β phase about 76 μm thick, and an outer layer of γ phase about 15 μm thick,
- draw to 0.62 mm; the γ phase fractures,
- carry out a second heat treatment of 7 hours at 327° C.; we obtain a layer of β-phase brass 39 μm thick, and an 8 μm layer of blocks of fractured γ-phase brass also containing β phase, make a coating of 6.5 µm of zinc on the fractured γ phase, degreased and deoxidized beforehand, draw to 0.42 mm, carry out a third heat treatment of 32 hours at 145° C., at the end of which a coating is obtained comprising an inner layer of β-phase brass 16 µm thick and a layer of γ-phase brass 14 µm thick, draw to 0.25 mm.

It was found that, in a wire D of this kind, the degree of longitudinal coverage that was obtained was about 86%. Covered pores are observable in cross sections of the wire. Some of these pores may be larger than 4 µm. On average, more than 5 covered pores larger than 2 µm are observed per complete cross section of the wire.

Example No. 5

In this fifth example, the electrode wire (sample E) was produced by the following method:

take a brass wire with 63% copper and 37% zinc, with a diameter of 1.25 mm, deposit a first layer of zinc 14 µm thick on this core, draw this wire to 0.827 mm, subject the blank thus obtained to diffusion heat treatment until the coating no longer has zinc at the surface; in practice, the heat treatment may be of 4 hours at 180° C.; we obtain a layer of about 13 µm of γ-phase brass, and a surface layer of ε-phase brass about 7 µm thick, without a trace of zinc, draw to 0.25 mm.

Figure 9:
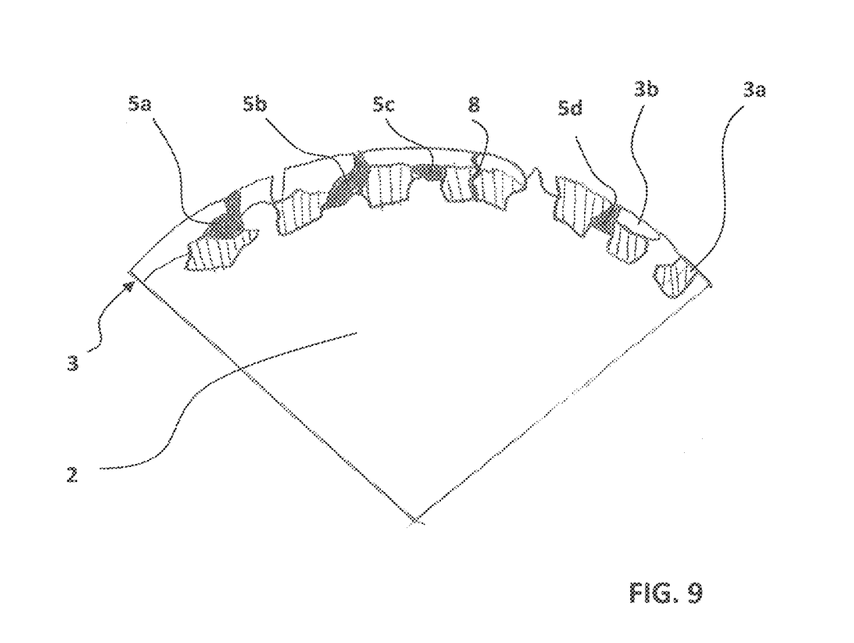
FIG. 9 is a schematic partial cross-sectional view of a wire sample E according to example No. 5 of the present invention.

A wire sample E of this kind is shown schematically in partial cross section in FIG. 9.

It was found that, in a wire E of this kind, the degree of longitudinal coverage that was obtained was about 86%. The layer 3a of γ-phase brass is fractured, comprising blocks of brass of variable thickness, which may reach 12 µm. Covered pores 5a, 5b, 5c, 5d are observable in cross sections of the wire. Some of these pores may be larger than 4 µm. On average, in the coating 3 covering the core 2, more than 5 covered pores larger than 2 µm are observed per complete cross section of the wire.

A crack 8 is illustrated schematically in FIG. 9, which is clearly different from the covered pores according to the present invention with respect to its shape and its volume, and which opens onto the surface of the wire.

Example No. 6

In this sixth example, the electrode wire (sample F) was produced by the following method:

take a core of brass with 63% copper and 37% zinc, with a diameter of 1.25 mm, deposit a first layer of zinc with a thickness of 20 µm on this core.

draw to 0.827 mm, carry out a first heat treatment of 5 hours at 180° C. to obtain: a sublayer of alloy of copper and zinc of γ phase about 15 µm thick, an intermediate layer of alloy of copper and zinc of ε phase of about 6 µm, and an outer layer of lightly alloyed copper and zinc alloy of η phase about 6 µm thick, draw to 0.25 mm; the γ phase fractures, and the coating covering the core is a mixture of blocks of alloy of copper and zinc of γ phase, with, between the blocks, pores covered with a mixture of alloys of copper and zinc of ε phase and η phase.

Figure 10:
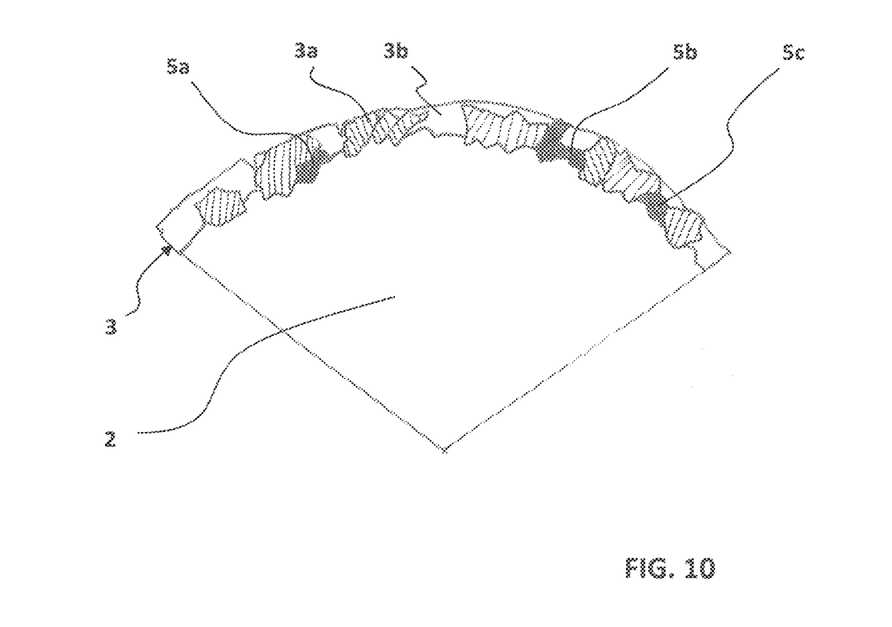
FIG. 10 is a schematic partial cross-sectional view of a wire sample F according to example No. 6 of the present invention.

A wire sample F of this kind is shown schematically in partial cross section in FIG. 10.

It was found that, in a wire F of this kind, the degree of longitudinal coverage that was obtained was greater than about 90%. Covered pores 5a, 5b, 5c are observable in cross sections of the wire. Some of these pores may be larger than 4 µm. On average, more than 5 covered pores larger than 2 µm are observed per complete cross section of the wire.

With a subsequent heat treatment at low temperature (about 60° C. for 48 hours), a wire was produced (sample F') in which the outer layer 3b of zinc covering the pores was converted by diffusion into ε-phase brass, without the core 2 being recrystallized, and without causing the covered pores 5a, 5b, 5c to disappear.

With a second subsequent heat treatment at about 180° C. for 2 hours, a wire was produced (sample F") in which the outer layer 3b of alloy of copper and zinc of ε phase covering the pores was converted by diffusion into alloy of copper and zinc of γ phase, without the core 2 being recrystallized, and without causing the covered pores 5a, 5b, 5c to disappear.

Example No. 7

In this seventh example, the electrode wire (sample G) was produced by the following method:

take a brass wire with 60% copper and 40% zinc, with a diameter of 1.20 mm, deposit a layer of zinc 13 µm thick on this core, draw this wire to 0.464 mm, the layer of zinc then being 5 µm thick, subject the blank thus obtained to a diffusion heat treatment comprising a rise in temperature over 4 hours from room temperature up to a stationary phase of 11 hours at 140° C., followed by a fall in temperature over 5 hours down to room temperature; the coating then comprises an inner layer of γ-phase brass of about 6 µm, and a surface layer of ε-phase brass about 2 µm thick, without trace of zinc, gradually draw down to a final diameter, for example by using 5 successive dies down to a final diameter of 0.30 mm, or by using 8 successive dies down to a final diameter of 0.25 mm, or by using 10 successive dies down to a final diameter of 0.20 mm.

Figure 13:
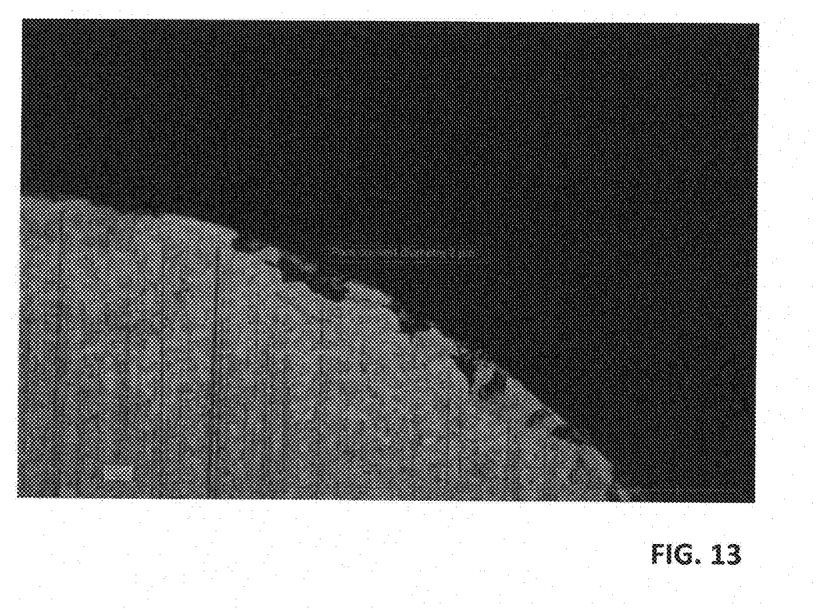
FIG. 13 is a light microscope photograph of a cross section of a wire sample G with a diameter of 0.25 mm according to the present invention.
Figure 14:
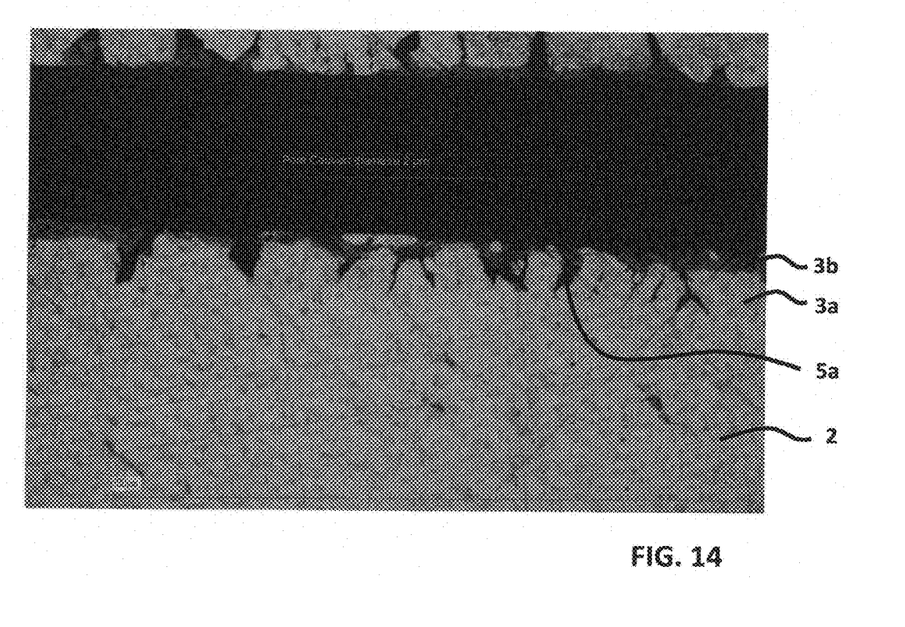
FIG. 14 is a light microscope photograph of a longitudinal section of the wire sample G in FIG. 13.
Figure 15:
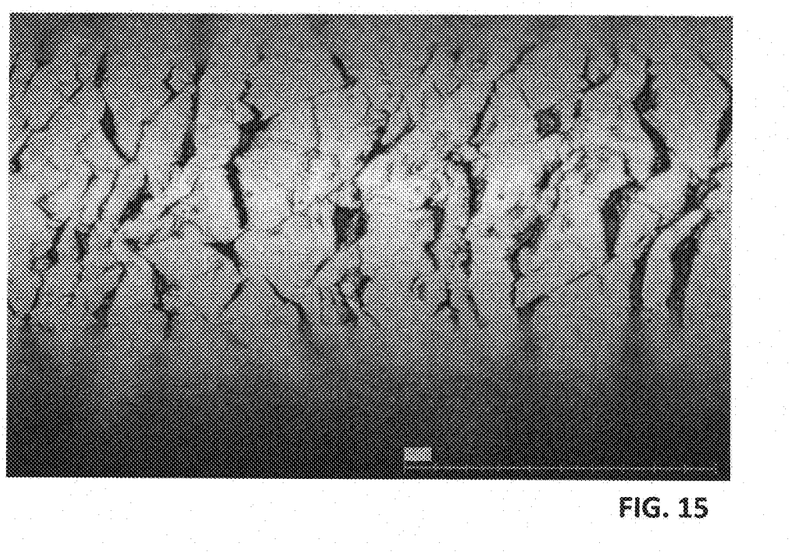
FIG. 15 is a light microscope photograph of the surface of the wire sample G in FIG. 13.
Figure 16:
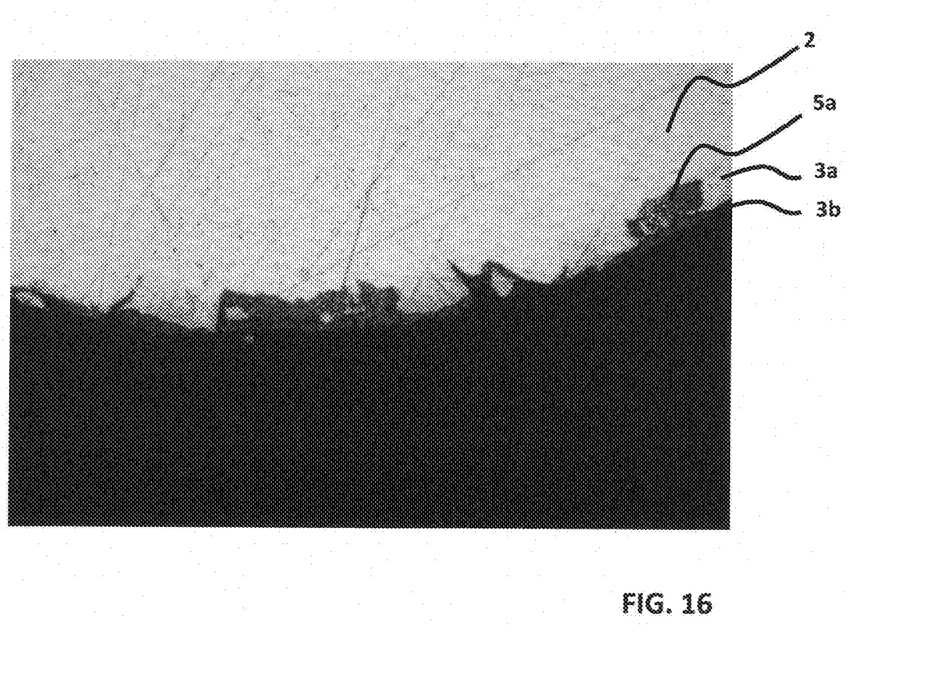
FIG. 16 is a light microscope photograph of a cross section of a wire sample G with a diameter of 0.30 mm according to the present invention.

FIGS. 13, 14 and 15 are optical microscope photographs of a sample wire G 0.25 mm in diameter, respectively in cross section, in longitudinal section, and as a surface view. FIG. 16 is an optical microscope photograph of a sample wire G 0.30 mm in diameter in cross section. The following have been marked out on these photographs: the core 2, the inner layer 3a of alloy of copper and zinc of fractured gamma phase, the outer layer 3b of alloy of copper and zinc of ε phase, and covered pores 5a.

It could be seen that, in such a wire G, the degree of longitudinal coverage which was obtained was about 88% when the diameter of the electrode wire is 0.30 mm. The degree of longitudinal coverage was about 77% when the diameter of the electrode wire is 0.25 mm. The degree of longitudinal coverage was about 66% when the diameter of the electrode wire is 0.20 mm. The layer of γ-phase brass is fractured, comprising blocks of brass of substantially constant thickness. Covered pores 5a are observable in sections of the wire. Some of these pores are larger than 2 µm. On average, in the coating covering the core, more than 5 covered pores larger than 2 µm are observed per complete cross section of the electrode wire.

The sample B of the second example, and the sample G of the seventh example, are obtained by methods particularly suitable for industrial production as just one heat treatment is necessary. In the case of the sample G, this heat treatment is carried out on a wire diameter which is markedly greater than the final diameter, which is even more favorable in industrial production.

Tests

Comparative machining tests were carried out, demonstrating the advantageous effect of the present invention.

The machining tests were carried out with the electrode wires A, A', B, C, D, E, F, F', F" and G whose manufacture is described above, comparing them with:

- a wire (sample LA) with a diameter of 0.25 mm of bare brass with 63% copper and 37% zinc,
- a wire (sample T) with a diameter of 0.25 mm having a core of copper-zinc alloy with 63% copper and 37% zinc, a coating covering practically 100% of the surface of the core and comprising blocks of alloy of copper and zinc of fractured γ phase, said blocks being embedded in a matrix of alloy of copper and zinc of ε phase that fills the interstices between the blocks of γ phase; this wire is as described in document U.S. Pat. No. 8,067,689 B2 according to the embodiment with ε phase,
- a wire (sample SD2) with a diameter of 0.25 mm having a core of alloy of copper and zinc at 63% copper and 37% zinc, a coating having a sublayer of alloy of copper and zinc of β phase and an outer layer of alloy of copper and zinc of fractured γ phase, i.e. having open pores,
- a wire (sample SE) with a diameter of 0.25 mm having a core of alloy of copper and zinc at 80% copper and 20% zinc, a coating having a sublayer of alloy of copper and zinc of β phase and an outer layer of alloy of copper and zinc of fractured γ phase, i.e. having open pores,
- a wire (sample SA) with a diameter of 0.25 mm having a core of alloy of copper and zinc at 63% copper and 37% zinc, a coating of alloy of copper and zinc of fractured γ phase having blocks of alloy of substantially constant thickness and revealing the core in the fractures, i.e. having open pores.

All the machining tests were carried out using a GFMS P350 machine, on a steel workpiece with a height of 50 mm, with detached nozzles of 4.4 mm at the bottom and 5.0 mm at the top, with AC CUT VS+ 0.25 mm technology (ACO=0), with I changed from 17 to 18, P changed from 54 to 45 to give about 10 A of machining current, and with FW changed from 17 to 10.

Regarding the comparative tests for evaluating the production or powder during machining, a length of wire of about 1000 linear meters, tensioned at 10 N, was passed through a ceramic wire guide of an electric discharge machine, the powder was collected under the wire guide on an adhesive surface, and the amounts of powder deposited were compared. Comparison was essentially visual, with the naked eye, adopting five thresholds of amount, namely an undetectable amount, a very small amount, a medium amount, a large amount, and a very large amount. The standard for amount is obtained with SA, SD2 and SE wires, which are mass-produced wires that have been marketed by the applicant for several years. The SA wire produces only an undetectable amount of powder during electric discharge machining. The SD2 and SE wires are completely satisfactory thanks to the fact that they produce only a very small amount of powder during electric discharge machining.

The results are presented in the following table.

| Wire | Machining speed (mm²/min) | Amount of powder | State of surface |
|---|---|---|---|
| Wire LA | 83.8 | medium | |
| Wire SD2 | 99.8 | very small | |
| Wire SE | 106.6 | very small | |
| Wire SA | 90 | undetectable | excellent (0.16 μm) |
| Wire T | 96.0 | very large | 0.20 μm |
| Wire A | 94.2 | medium | |
| Wire A' | 96.0 | medium | |
| Wire B | 100.3 | very small | good (0.20 μm) |
| Wire C | 107.1 | large | |
| Wire D | 110.1 | very small | |
| Wire E | 101.9 | medium | mediocre |
| Wire F | 97.0 | very small | mediocre |
| Wire F' | 108 | | mediocre |
| Wire F" | 110 | large | mediocre |
| Wire G (0.25 mm) | 95 | undetectable | excellent (0.15 μm) |

The covered pores of wires A and A' are apparently too small to have an advantageous effect on the machining speed notably relative to wire SD2.

However, comparison of the machining speeds of wires A and A' shows the advantage of the ε phase relative to pure zinc or of η phase.

On examining wires B and E with covered pores of sufficient size, we find an increase in rough machining speed relative to wires having an identical core structure of brass CuZn37 and having a coating with open pores or with small covered pores (wires SD2, A, A').

In particular, wire E, which was produced by depositing the same amount of zinc as wire A', shows the advantage of the presence of covered pores of more than 4 μm in the coating. Compared to wire E, wire A' only has pores with diameter less than 2 μm.

Wire B gave low roughness values in finishing, of the order of 0.20 μm of Ra. It generates little powder when it passes through the wire guides of the machine. Wire B demonstrates that, to reconcile a high machining speed, a low roughness value, and little release of powder, it may be advantageous to produce covered pores of more than 4 μm covered with alloy of copper and zinc of ε phase between fractured blocks of regular thickness of alloy of copper and zinc of γ phase. In comparison with wire SD2, the core of which has the same composition, wire B demonstrates the advantage of the presence of large covered pores.

On examining wire D with covered pores of sufficient size, we find an increase in rough machining speed relative to wires having an identical core structure of brass CuZn20 and having a coating with open pores (wire SE).

Wire F has a relatively low machining speed, despite the presence of the coating layer of fractured γ phase, of ε phase, and of covered pores. The presence of zinc of η phase seems to be the cause of this result.

In comparison with wire F, wire F demonstrates the advantage of having covered pores of more than 3 μm in a coating of alloy of copper and zinc of ε phase without η phase.

Wire G gave very low roughness values in finishing. The amount of powder produced when it passes through the wire guides of the machine is virtually undetectable. Wire G demonstrates that, to reconcile a high machining speed, a very low roughness value and a virtually undetectable release of powder, it may be advantageous to produce covered pores of more than 2 μm covered with alloy of copper and zinc of ε phase between fractured blocks of regular thickness of alloy of copper and zinc of γ phase. In comparison with wire SA, which exhibits the same structure having fractured blocks of regular thickness of alloy of copper and zinc of γ phase, wire G demonstrates the advantage of the presence of covered pores for increasing the machining speed.

The present invention is not limited to the embodiments that have just been described explicitly, but includes the several variants and generalizations thereof that are within the scope of the claims given hereunder.

The invention claimed is:

1. An electrode wire for electric discharge machining, said electrode wire comprising:
   a metal core, comprising one or more layers of metal or metal alloy,
   on the metal core, a coating having an inner layer comprising an alloy different from that of the metal core and containing more than 50 wt % zinc, and having an outer layer,
   wherein:
   said inner layer comprises fractured γ phase copper-zinc alloy,
   said inner layer comprising fractured γ phase copper-zinc alloy contains pores larger than 2 μm,
   said outer layer comprises one or more alloys of copper and zinc with more than 58% and less than 100% zinc by weight and covers some or all of the pores.

2. The electrode wire as claimed in claim 1, wherein the coating covers the metal core at a coverage greater than 85% when the diameter of the electrode wire is about 0.30 mm, at a coverage greater than 75% when the diameter of the electrode wire is about 0.25 mm, or at a coverage greater than 65% when the diameter of the electrode wire is about 0.20 mm.

3. The electrode wire as claimed in claim 1, wherein the coating covers the metal core at a coverage greater than 85% when the diameter of the electrode wire is 0.25 mm.

4. The electrode wire as claimed in claim 1, wherein some or all of the pores are covered with one or more alloys of copper and zinc with more than 78% and less than 100% zinc by weight.

5. The electrode wire as claimed in claim 1, wherein the coating comprises on average, in each complete cross section of the electrode wire, at least 3 covered pores larger than 2 μm.

6. The electrode wire as claimed in claim 1, wherein the coating comprises on average, in each complete cross section of the electrode wire, at least 5 covered pores larger than 2 μm.

7. The electrode wire as claimed in claim 1, wherein the coating contains covered pores larger than 3 μm.

8. The electrode wire as claimed in claim 1, wherein the coating contains covered pores larger than 4 μm.

9. The electrode wire as claimed in claim 1, wherein the core comprises a metal core and an intermediate layer of alloy of copper and zinc of β phase.

10. The electrode wire as claimed in claim 9, wherein the core is of copper or copper alloy.

11. A method of manufacturing an electrode wire as claimed in claim 1, comprising the sequence of steps:
    taking a core of brass with 63% copper and 37% zinc, with a diameter of 1.25 mm,
    depositing a first layer of zinc with a thickness of 20 μm on this core,
    drawing to 0.30 mm,
    carrying out a diffusion heat treatment at 180° C. for 2 hours for partially transforming the said first layer of zinc into a layer of γ phase brass; the coating then comprises a layer of γ phase near the core, and an outer layer of ε phase,
    drawing to 0.25 mm.

12. A method for producing an electrode wire as claimed in claim 1, comprising the steps:
    taking a core of brass with 80% copper and 20% zinc, with a diameter of 1.20 mm,
    depositing a first layer of zinc with a thickness of 30 μm on this core,
    carrying out a first heat treatment of 20 hours at 385° C. to obtain: a sublayer of β phase about 60 μm thick, and an outer layer of γ phase about 15 μm thick,
    drawing to 0.62 mm; the γ phase fractures,
    making a coating of 3 μm of zinc on the fractured γ phase, degreased and deoxidized beforehand,
    drawing to 0.25 mm,
    carrying out a second heat treatment of 5 hours at 130° C.

13. A method for producing an electrode wire as claimed in claim 1, comprising the steps:
    taking a core of brass with 80% copper and 20% zinc, with a diameter of 1.20 mm,
    depositing a first layer of zinc 38 μm thick on this core,
    carrying out a first heat treatment of 22 hours at 395° C. to obtain: a sublayer of β phase about 76 μm thick, and an outer layer of γ phase about 15 μm thick,
    drawing to 0.62 mm; the γ phase fractures,
    carrying out a second heat treatment of 7 hours at 327° C.; obtaining a layer of β phase brass 39 μm thick, and an 8 μm layer of blocks of fractured γ phase brass also containing β phase,
    making a coating of 6.5 μm of zinc on the fractured γ phase, degreased and deoxidized beforehand,
    drawing to 0.42 mm,
    carrying out a third heat treatment of 32 hours at 145° C., at the end of which a coating is obtained comprising an inner layer of β phase brass 16 μm thick and an outer layer of γ phase brass 14 μm thick,
    drawing to 0.25 mm.

14. A method for producing an electrode wire as claimed in claim 1, comprising the steps:
    taking a core of brass with 60% copper and 40% zinc, with a diameter of 1.20 mm,
    depositing a layer of zinc 13 μm thick on this core,
    drawing this wire to 0.464 mm, the layer of zinc then being 5 μm thick,
    subjecting the blank thus obtained to a diffusion heat treatment comprising a rise in temperature over 4 hours from room temperature up to a stationary phase of 11 hours at 140° C., followed by a fall in temperature over 5 hours down to room temperature; the coating then comprises an inner layer of γ phase brass of about 6 μm, and an outer layer of ε phase brass about 2 μm thick, without trace of pure zinc,
    gradually drawing down to a final diameter, said final diameter advantageously being 0.20 mm, 0.25 mm or 0.30 mm.

15. An electrode wire for electric discharge machining, said electrode wire comprising:
    a metal core, comprising one or more layers of metal or metal alloy,
    on the metal core, a coating having an alloy different from that of the metal core and containing more than 50 wt % zinc, in which:

the coating comprises copper-zinc alloy of fractured γ phase, wherein:

the coating contains covered pores larger than 2 μm, some or all of the pores are covered with one or more alloys of copper and zinc with more than 58% and less than 100% zinc by weight, and wherein some or all of the pores are covered with a mixture of alloys of copper and zinc of ε phase and η phase.

\* \* \* \* \*